Figure 1:
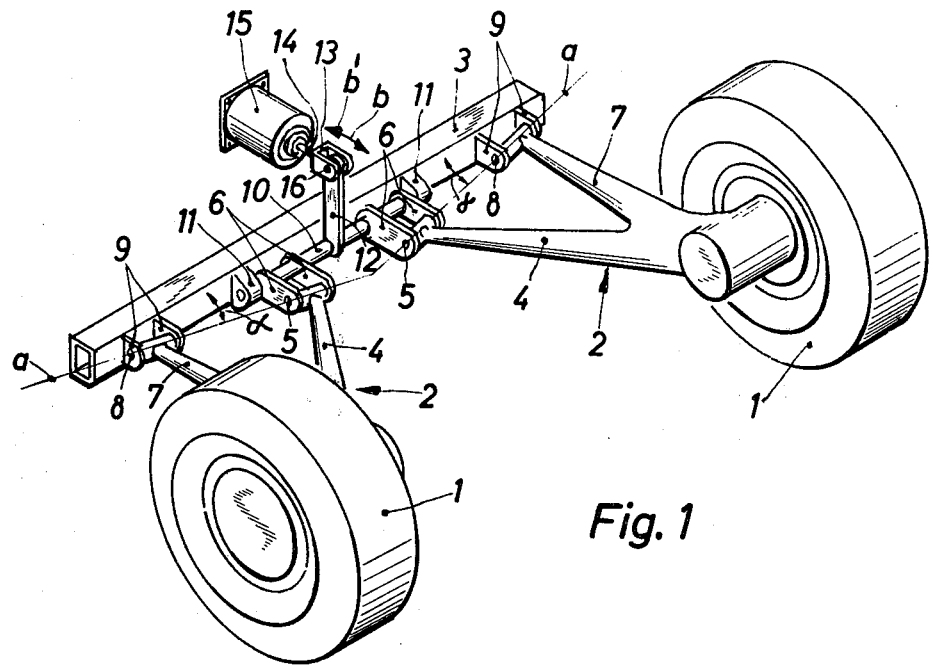

United States Patent [19]

Matschinsky

[11] 4,168,075
[45] Sep. 18, 1979

[54] INDEPENDENT WHEEL SUSPENSION FOR REAR WHEELS OF AUTOMOBILES, ESPECIALLY PASSENGER CARS

[75] Inventor: Wolfgang Matschinsky, Munich, Fed. Rep. of Germany

[73] Assignee: Bayerische Motoren Werke Aktiengesellschaft, Fed. Rep. of Germany

[21] Appl. No.: 745,983

[22] Filed: Nov. 29, 1976

[30] Foreign Application Priority Data

Nov. 28, 1975 [DE] Fed. Rep. of Germany ....... 2553494

[51] Int. Cl.² .............................................. B60G 19/00
[52] U.S. Cl. .................................... 280/6 H; 280/689
[58] Field of Search .............. 280/664, 665, 689, 690; 180/71, 73 R

[56] References Cited

U.S. PATENT DOCUMENTS

| 3,893,680 | 7/1975 | Marcillat | 280/689 |
| 3,894,602 | 7/1975 | Van Der Ohe | 280/664 |

*Primary Examiner*—Philip Goodman
*Attorney, Agent, or Firm*—Craig and Antonelli

[57] ABSTRACT

An independent rear wheel suspension of the type including pivotal wheel control or guide members is provided with an adjusting mechanism for adjusting at least two mutually corresponding points of articulation of the wheel control members, at least one on each side of the longitudinal central plane of the vehicle, in response to varying vehicle load and/or vehicle speed such that, as seen from the rear of the vehicle, a changed direction of motion of the centers of ground contact of both wheels, i.e. a changed positional level of the roll center, results during inward and outward spring deflections in accordance with the respective load on the vehicle and/or speed of the vehicle.

26 Claims, 2 Drawing Figures

INDEPENDENT WHEEL SUSPENSION FOR REAR WHEELS OF AUTOMOBILES, ESPECIALLY PASSENGER CARS

This invention relates to an independent rear wheel suspension for automobiles, especially passenger cars, wherein the respective wheel control members of the suspension are arranged at the vehicle body in a pivotable fashion, or so that they are both pivotable and positively axially displaceable by way of an additional guide means disposed eccentrically and obliquely with respect to the axis of rotation, and in particular, wherein means are provided for adjusting articulation points of the wheel control members, so as to change the level of the roll center.

DAS (German Published Application) No. 1,937,320, for example, discloses an independent rear wheel suspension, the wheel control or guide members of which are positively displaceable approximately in the transverse direction of the vehicle in dependence on the inward and outward spring deflection of the wheels. This independent wheel suspension comprises an additional guide means articulated to the wheel control member as well as to the body of the vehicle outside of the axis of rotation of the wheel control member. The additional guide means has the effect that the wheel control member is perforce displaced along its axis during rotation whereby a certain path of the center of tire contact with the ground, and thus, a specific position of the roll center, are produced.

In passenger cars wherein the engine is located in the front, an empty vehicle is greatly front-heavy and consequently tends toward understeering, whereas a fully loaded vehicle is generally tailheavy and thus tends toward oversteering.

By the use of a semi-trailing control arm having a pivot axis extending at an angle to the transverse plane of the vehicle in a rear wheel suspension, such as provided for in the above-mentioned wheel suspension, a kinematic inherent steering characteristic is obtained of such a type that the steering behavior of the empty vehicle is corrected in the sense of oversteering, and the fully loaded vehicle is corrected in the sense of understeering. However, disadvantageously, the same steering angles and/or changes in toe-in occur also during straight driving and interfere with straight running of the car at instants when springing motions occur. Inasmuch as displacement of the roll center directly affects the inherent steering characteristic due to wheel slip angle, this method is to be preferred to the method of changing inherent steering characteristic by varying toe-in.

Starting with this consideration, it is an object of this invention to provide a device by means of which the roll center can in each case be shifted or changed into the correct position.

In order to attain this object, it is proposed to provide an adjusting mechanism by means of which at least two mutually corresponding points of articulation of the wheel suspensions of an axle, at least one on each side of the longitudinal central plane of the vehicle, are adjusted, in the same direction and by the same amount, in dependence on a varying load on the vehicle and/or on the vehicle speed, so that as seen from the rear of the vehicle, there results a changed direction of motion of the center of tire ground contact of both wheels during inward and outward spring deflections, i. e. a changed level of the roll center, in correspondence with the respective load on the vehicle and/or the speed of the vehicle.

The advantages of a controllable roll center are to be seen primarily in that, in case of a load-dependent control, a uniform driving characteristic is provided, no matter whether the vehicle is loaded or empty. With a speed-dependent control, or with a control adjustable by the driver, a readily manageable vehicle is obtained with oversteering in narrow curves and in city driving conditions, along with a stable straight-driving characteristic during rapid driving. Moreover, driving safety and driving comfort are improved by a controllable roll center.

Figure 2:
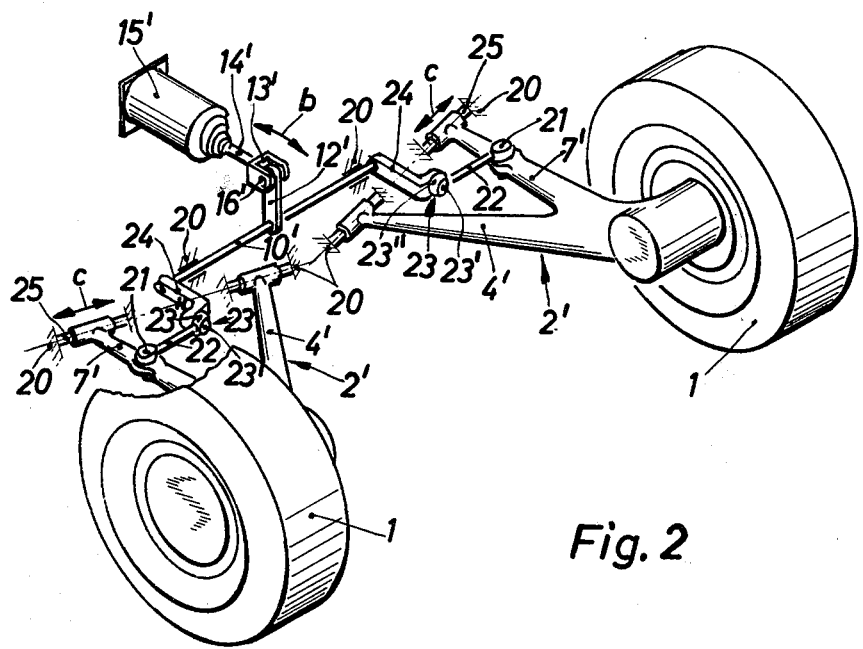

The drawing shows two non-limitative embodiments of the invention to wit:

FIG. 1 shows an independent wheel suspension with an adjustable roll center and with varying camber, and FIG. 2 shows an independent wheel suspension wherein only the roll center is adjustable.

The independent wheel suspension illustrated in the embodiment of FIG. 1 has wheels 1, each of which is supported on a carrier 3 by means of wheel control or guide members 2 fashioned as a triangulated control arm. Driving of the wheels may be conventionally provided, but is not illustrated for purposes of clarity in that the invention is directed to the wheel suspension arrangement.

The adjusting mechanism serving for the adjustment of the suspension of the wheels 1 in the same sense comprises the following components: an adjusting member 15 fixedly mounted to the vehicle body, provided with a push rod 14, the latter carrying on one end a universal joint fork 13, a hinge arm 12 being articulated to this fork by way of a hinge bolt 16, the hinge arm, being, in turn, rigidly connected to a shaft 10.

The shaft 10 is rotatably supported at both ends on the carrier 3 by way of bearing blocks 11. In the zone of each of the ends of the shaft 10, respectively, one pair of fishplates 6 lying in parallel planes is attached for rotation therewith. At the opposed ends of both pairs of fishplates 6, the arms 4 of the wheel control members 2 are articulated by respective pivot axles or fulcrum shaft axles 5. The outwardly disposed arms 7 of the wheel control members 2 are pivotably supported in the zone of their ends at the sides of the vehicle body by way of respective pivot axles 8 in bearing blocks 9. The bearing blocks 9 are mounted to the carrier 3.

An axis a extends respectively through the pivot axles 5 and 8; these axes intersect each other in the region of the longitudinal plane of symmetry of the vehicle, i. e. the plane extending in the longitudinal driving direction of the vehicle. The axis a forms the pivot axis of the wheel control member 2 and is arranged at an angle α from the rearward plane of the carrier 3.

The adjusting member 15 is fashioned, in the embodiment, as a hydraulic servomotor, such as including a piston acted on by a hydraulic medium moving a piston rod, (i. e. the push rod 14), and being actuated by way of a control valve (not shown) cooperating with a control linkage, likewise not illustrated. The control linkage can be mounted to respectively each wheel control member 2 or, provided with a balancing means, at both control members. Furthermore, instead of the hydraulic actuation, it is also possible to actuate the adjusting member 15 mechanically, electronically, pneumatically, or by other means.

By means of the adjusting mechanism, the roll center of both wheels 1 can also be adjusted during driving of the vehicle, taking its respective speed into account. For this purpose, the push rod 14 is moved in the direction of arrow b or b' by means of the adjusting member 15, whereby the hinge arm 12 is pivoted toward the adjusting member 15 or away therefrom. The shaft 10 is rotated by way of the hinge arm 12, whereby the pairs of guide means 6 are pivoted in the upward or downward direction, so that the roll center is raised or lowered in the aforementioned way.

This adjustment of the roll center can be made automatically in the aforementioned manner.

A high roll center is to be set most advantageously during slow driving and while traversing narrow curves, whereas a low roll center is to be set during higher speeds to obtain optimum driving safety and satisfactory driving comfort. A speed-dependent regulation of the roll center can be effected either manually by the driver or automatically by coupling the adjusting member 15 with the speedometer of the automotive vehicle.

FIG. 2 shows an independent wheel suspension wherein the wheels 1 are each mounted to an automobile body 20 by way of the wheel control members 2', fashioned as triangulated control arms, with two arms 4', 7' thereof. The two arms 4', 7' are supported, in this embodiment, on respective pivot axles 25 so that each of the wheel control members 2' is positively axially displaceable along the lines of the double arrow c, i. e. approximately at right angles to the longitudinal extension or driving direction of the vehicle. A guide means 22 is articulated respectively to each of the two arms 7' by way of a hinge coupling 21. This guide means 22 carries on its opposite end a part 23" of a joint 23 which can be a ball joint, for example. Another part 23' of the joint 23 is attached to respective connecting members 24. The two connecting members 24 are rigidly joined to a shaft 10'. The components 12', 16', 13', 14', 15' connected to this shaft 10' in the zone of its longitudinal center are the same as the corresponding components of the independent wheel suspension according to FIG. 1.

A longitudinal displacement of the push rod 14' in the direction of the double arrow b (caused by the adjusting member 15' which may be of the same type as considered in FIG. 1) has the effect in that the shaft 10' is rotated by way of the hinge arm 12', whereby the connecting members 24 execute an upwardly or downwardly oriented pivotal motion, and thereby, cause the joints 23 and the guide means 22 to assume a different position. As a result, there is a change in the dependency of the axial displacement of the wheel control members 2' along the lines of the double arrow c during the inward and outward spring deflections. During this procedure, the roll center of the independent wheel suspension constructed according to this invention is lowered or raised.

As for the advantageous utilization of a high or low roll center, analogous remarks apply as set forth above in connection with the independent wheel suspension according to FIG. 1.

It is, of course, also possible within the scope of this invention to fashion the wheel control members 2' of the independent wheel suspension shown in FIG. 2 as longitudinal control arms, i. e. with pivot axes 25 extending at right angles to the longitudinal central plane of the vehicle.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

I claim:

1. In an independent rear wheel suspension of a vehicle, such as an automobile, comprising at least one wheel control means on each side of the longitudinal central plane of the vehicle, the respective wheel control means being pivotably connected to the vehicle structure and provided on the vehicle structure side thereof with respective corresponding linkage points of articulation which are adjustable in their vertical position with respect to the vehicle structure, the improvement comprising adjusting means being provided for coordinately adjusting the position of said respective corresponding linking points in the same direction and by the same amount in response to varying vehicle speed such that as seen from a rear view of the vehicle there results, in correspondence with the respective speed of the vehicle, a changed direction of motion of the center of ground contact of both wheels with inward and outward spring deflections, i.e. there results a changed level of the roll center, and characterized in that the adjusting means comprises linkage means operatively connected to said wheel control means and driving means operatively connected to said linkage means for driving said linkage means to move said points of articulation of said wheel control means and characterized in that the driving means includes a movable push rod, and said linkage means includes an arm articulated to one end of said push rod, a shaft rigidly connected to said arm, said shaft being rotatably mounted at its ends to the vehicle structure, and intermediate means rigidly connected to said shaft for rotation therewith, said intermediate means being further articulated to said wheel control means for adjusting said points of articulation.

2. An independent rear wheel suspension according to claim 1, characterized in that said wheel control means include triangular members having two angularly disposed arms, at least one of said two arms of each of said members being pivotally connected to said vehicle structure, and said intermediate means being articulated to the other of said two arms of each of said members.

3. An independent rear wheel suspension according to claim 2, characterized in that the intermediate means include a pair of fishplates rigidly mounted on said shaft at opposite sides of said arm of said linkage means, each of said pair of fishplates having a free end directly pivotally connected to said other of said two arms of each of said members.

4. An independent rear wheel suspension according to claim 3, characterized in that the pivot axes of the pivotal connections of both of the angularly disposed arms of each of said members form a line at an angle $\alpha$ with respect to the transverse plane of the vehicle.

5. An independent rear wheel suspension according to claim 3, characterized in that the pivot axes of the pivotal connections of both of the angularly disposed arms of each of said members extend at right angles to the longitudinal central plane of the vehicle.

6. An independent rear wheel suspension according to claim 3, characterized in that the driving means further includes a hydraulic servomotor.

7. An independent rear wheel suspension according to claim 3, characterized in that the driving means is mechanically actuated.

8. An independent rear wheel suspension according to claim 3, characterized in that the driving means is electronically actuated.

9. An independent rear wheel suspension according to claim 3, characterized in that the driving means is pneumatically actuated.

10. An independent rear wheel suspension according to claim 3, characterized in that the adjusting means is operatively connected with a speed indicator of the vehicle.

11. An independent rear wheel suspension according to claim 4, characterized in that the intermediate means include connecting members rigidly secured to said shaft, each of said connecting members having a free end, and joint means mounted at said free end for effecting an articulation with respective second connecting members, each of said second connecting members being articulated with said other of said angularly disposed arms of each of said triangular members.

12. An independent rear wheel suspension according to claim 11, characterized in that both of said two angularly disposed arms of each of said triangular members are pivotally connected at the vehicle structure along pivot axes extending at right angles to the longitudinal central plane of the vehicle.

13. An independent rear wheel suspension according to claim 11, characterized in that both of said two angularly disposed arms of each of said triangular members are pivotally connected at the vehicle structure, said two arms of each of said members being axially displaceable in a direction approximately at right angles to the vehicle longitudinal direction on respective pivot axles, said pivot axles extending obliquely toward the rear of the vehicle.

14. An independent rear wheel suspension according to claim 13, characterized in that the driving means further includes a hydraulic servomotor.

15. An independent rear wheel suspension according to claim 13, characterized in that the driving means is mechanically actuated.

16. An independent rear wheel suspension according to claim 13, characterized in that the driving means is electronically actuated.

17. An independent rear wheel suspension according to claim 13, characterized in that the driving means is pneumatically actuated.

18. An independent rear wheel suspension according to claim 13, characterized in that the adjusting means is operatively connected with a speed indicator of the vehicle.

19. An independent rear wheel suspension according to claim 2, characterized in that both of said two angularly disposed arms of each of said triangular members are pivotally connected at the vehicle structure, said two arms of each of said members being axially displaceable in a direction approximately at right angles to the vehicle longitudinal direction on respective pivot axles, said pivot axles extending obliquely toward the rear of the vehicle.

20. In an independent rear wheel suspension of a vehicle, such as an automobile, comprising at least one wheel control means on each side of the longitudinal central plane of the vehicle, the respective wheel control means being pivotally connected to the vehicle structure and provided on the vehicle structure side thereof with respective corresponding linkage points of articulation which are adjustable in their vertical position with respect to the vehicle structure, the improvement comprising adjacent means being provided for coordinately adjusting the position of said respective corresponding linkage points in the same direction and by the same amount in response to varying vehicle speed such that as seen from a rear view of the vehicle there results, in correspondence with the respective speed of the vehicle, a changed direction of motion of the center of ground contact of both wheels with inward and outward spring deflections, i. e. there results a changed level of the roll center and characterized in that the adjusting means includes a hydraulic servomotor.

21. In an independent rear wheel suspension, of a vehicle, such as an automobile comprising at least one wheel control means on each side of the longitudinal central plane of the vehicle, the respective wheel control means being pivotally connected to the vehicle structure and provided on the vehicle structure side thereof with respective corresponding linkage points of articulation which are adjustable in their vertical position with respect to the vehicle structure, the improvement comprising adjusting means being provided for coordinately adjusting the position of said respective corresponding linkage points in the same direction and by the same amount in response to varying vehicle speed such that as seen from a rear view of the vehicle there results, in correspondence with the respective speed of the vehicle, a changed direction of motion of the center of ground contact of both wheels with inward and outward spring deflections, i.e., there results a changed level of the roll center and characterized in that the adjusting means is operatively connected with a speed indicator of the vehicle.

22. In an independent rear wheel suspension of a vehicle, such as an automobile, comprising at least one wheel control means on each side of the longitudinal central plane of the vehicle, the respective wheel control means being pivotally connected to the vehicle structure and provided on the vehicle structure side thereof with respective corresponding linkage points of articulation which are adjustable in their vertical position with respect to the vehicle structure, the improvement comprising adjusting means being provided for coordinately adjusting the position of said respective corresponding linkage points in the same direction and by the same amount in response to varying vehicle speed such that as seen from a rear view of the vehicle there results, in correspondence with the respective speed of the vehicle, a changed direction of motion of the center of ground contact of both wheels with inward and outward spring deflections, i.e. there results a changed level of the roll center.

23. An independent rear wheel suspension according to claim 22, characterized in that the adjusting means is mechanically actuated.

24. An independent rear wheel suspension according to claim 22, characterized in that the adjusting means is electronically actuated.

25. An independent rear wheel suspension according to claim 22, characterized in that the adjusting means is pneumatically actuated.

26. An independent rear wheel suspension according to claim 22, characterized in that the adjusting means comprise linkage means operatively connected to said wheel control means and driving means operatively connected to said linkage means for driving said linkage means to move said points of articulation of said wheel control means.

* * * * *